Aug. 28, 1962 J. W. KELLER 3,051,000
SUBMERGENCE MEASURING APPARATUS
Filed Jan. 28, 1959 6 Sheets-Sheet 1

INVENTOR
JOHN W. KELLER

Aug. 28, 1962    J. W. KELLER    3,051,000
SUBMERGENCE MEASURING APPARATUS
Filed Jan. 28, 1959    6 Sheets-Sheet 2

INVENTOR
JOHN W. KELLER
BY Cushman, Darby & Cushman
ATTORNEYS

INVENTOR
JOHN W. KELLER

Aug. 28, 1962 J. W. KELLER 3,051,000
SUBMERGENCE MEASURING APPARATUS
Filed Jan. 28, 1959 6 Sheets-Sheet 4

INVENTOR
JOHN W. KELLER

BY Cushman, Darby & Cushman
ATTORNEYS

United States Patent Office 3,051,000
Patented Aug. 28, 1962

3,051,000
SUBMERGENCE MEASURING APPARATUS
John Walter Keller, Miami, Fla., assignor to Miami Shipbuilding Corporation, Miami, Fla., a corporation of Florida
Filed Jan. 28, 1959, Ser. No. 789,619
2 Claims. (Cl. 73—304)

This invention pertains to a control system for a hydrofoil craft of the submerged hydrofoil type.

It is known that if a marine craft or boat can be supported upon hydrofoils rather than by contact of the hull of the boat with the water, greatly increased speeds for given amounts of applied power can be achieved. However, in other than perfectly smooth water, operation of submerged hydrofoil type craft requires constant attention to the adjustment of angle of attack of the submerged control hydrofoils—or adjustment of trim tabs or the like upon fixed hydrofoils—so that the altitude of the hull above the water is adjusted to some extent to the wave action of the water to avoid striking the hull upon the crests of the waves. It is also a matter of common experience that a human operator cannot successfully observe the wave action and himself adjust the effective angle of attack or "lift" of the hydrofoils for any period of time. Accordingly, automatic control systems are necessitated. This invention pertains to various features of an automatic control system.

Previous approaches to the problem have mainly involved provision of means attached to the boat by protruding forward of the location of the supporting hydrofoils for detecting the rise and fall of the water surface at a position thusly in advance of the position of the main hydrofoils. This attempt to solve the problem of automatic control in rough water has been functionally successful, but the provision of such protruding structure for accomplishing the purpose of advance detection of wave action gives rise to numerous practical problems that are better avoided.

In accordance with one particularly important aspect of the present invention means are provided for detecting the instantaneous distance of the surface of the water in relation to the hull or main structure of the craft, and a time derivative is taken of this amount of altitude, and the time derivative is employed to alter the effective angle of attack of at least one submerged hydrofoil supporting the craft. While the invention applies if the altitude detection takes place in advance of the position of the main supporting hydrofoils, a particularly important aspect of the present invention is that the altitude detection need not take place in advance of the main supporting hydrofoils. Instead, the detection can be, for example, on the struts which are required in any event to support the main hydrofoils. A common submerged hydrofoil arrangement is to provide two spaced apart struts with hydrofoils at the bottom ends thereof, near the bow of the craft, and a single hydrofoil at the stern. Usually, it is the two forward hydrofoils that have means for adjusting the effective angle of attack thereof to increase or decrease the "lift." Of course, it is possible to also or exclusively adjust the angle of attack of the stern hydrofoil. In any event, by use of the above mentioned aspect of the present invention—the obtaining of a time derivative of the altitude measurement—it has been found possible to detect the altitude at a place no further forward than the main forward supporting struts. These struts are necessary in any event to support the hydrofoils, and therefore no additional member has been added for engagement with the water.

It is, therefore, a primary object of this invention to provide an improved control system for hydrofoil craft of the submerged hydrofoil type.

It is a further object of this invention to obtain time derivatives of altitude measurements, and other measurements as well, for automatically maintaining clearance between the water surface and the craft, in water of varying degrees of wave motion.

It is a further object of this invention to provide a completely electrical-electronic circuit—preferably transistorized for achieving the aforesaid control measurement and control purposes.

It is a further object of this invention to provide an improved submergence or altitude detecting device.

Further objects and the entire scope of inventive features will become more fully apparent from the following detailed description of illustrative embodiments. These illustrative embodiments can be best understood with reference to the accompanying drawings, wherein:

FIGURE 1 shows a side elevational view largely diagrammatic of an exemplary arrangement of a craft and hydrofoils of the submerged hydrofoil type.

FIGURE 2 is an end view of the craft shown in FIGURE 1.

FIGURE 3 is a top view of the craft shown in FIGURE 1.

Figure 4:
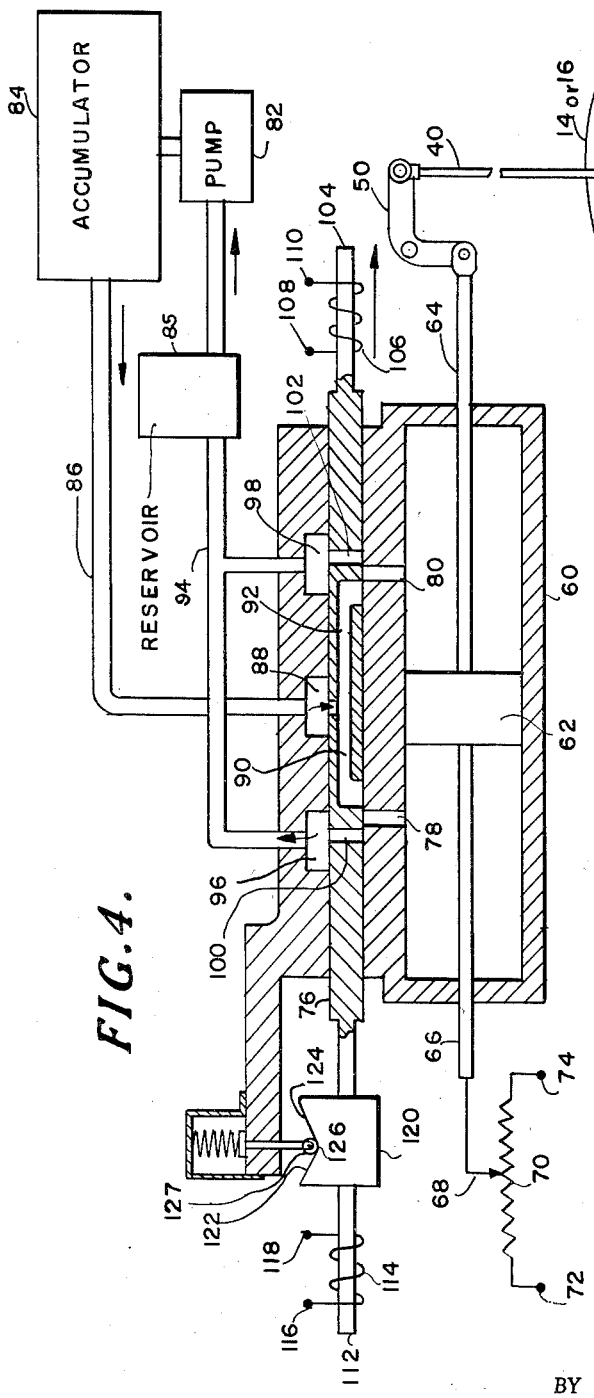
FIGURE 4 is a diagrammatic view of a typical electrically controlled hydraulically actuated hydrofoil driver unit, two of which are diagrammatically outlined in FIGURES 1–3.

FIGURES 1, 2 and 3 are intended to diagrammatically portray the general location and arrangement of components in an illustrative embodiment. Reference character 10 designates a boat which in operation is to be "flown" above the water surface 12 by support upon a forward port submerged hydrofoil 14, a forward submerged starboard hydrofoil 16 and a stern hydrofoil 18. Hydrofoil 14 is supported upon the bottom of a strut 20, hydrofoil 16 upon strut 22 and hydrofoil 18 upon strut 24. The hydrofoils 14 and 16 may be pivoted about a horizontal axis 26 so that the angle of attack thereof to the water may be controlled. In the illustrative example the hydrofoil 18 may be a fixed angle of attack which should suffice over the expected range of speeds of motion of the hydrofoil through the water, to support the stern of a boat of given weight. However, the angle of attack of hydrofoil 18 may be adjustable if desired.

The boat may be driven by use of any suitable propulsion means, for example, marine screws, water jets, etc. For purposes of illustration, engine 28 imparting rotary motion to a typical marine propeller 30 through conventional driving linkage including a gearbox 32, shaft 34 and further gearbox 36. The strut 24 may be further equipped with any suitable rudder 38 to cause changes in horizontal direction of movement of the craft.

Suitable arrangement may be provided for controlling the angle of attack of the hydrofoils 14 and 16. For example, this may be by push rods 40 housed within the struts 20 and 22 operating between an upper pivot point 42 and a lower pivot point 44, the latter being on the hydrofoil aft of the fixed pivot point 26. Within the hull of the craft 10 there may be suitable hydraulic actuating mechanisms 46, one for each of hydrofoils 14 and 16, these actuators operating through push rods 48 via the medium of a bell crank 50 connecting to the push rods 40 at the previously mentioned points 42.

Thus far, the craft and its components as described hereinabove do not depart from what is known in the art pertaining to submerged hydrofoil type craft, and no greater detail of explanation is thought necessary.

Still referring to FIGURES 1–3 there is in accordance with the present invention the provision upon the leading edge of struts 20 and 22 of a special construction marked in these figures by reference characters 52 and 54. These are identical altitude or submergence detecting devices— hereinafter altimeter detectors—one on the strut 20 and one on the strut 22. These will be described in detail hereinafter.

The general arrangement of actuators 46 may be entirely conventional. However, certain operative connections are to be made to the complete control system to be hereinafter described. Accordingly, in FIGURE 4 there is shown in diagrammatic form a conventional hydraulic actuator system which may be used, or the functional equivalent thereof, for exerting the forces necessary to actuate the hydrofoils 14 and 16. Briefly described, such actuator may comprise a main cylinder 60 housing a close-fitting piston 62 having a piston rod 64 attached to the previously mentioned bell crank 50 and a further piston rod 66 carrying the movable member 68 of a potentiometer resistor 70 having terminals 72 and 74 for connection to a circuit later to be described. The mechanism of FIGURE 4 additionally includes a movable valve member 76 which may be reciprocated horizontally as viewed in FIGURE 4. The main cylinder includes a first fluid passage 78 and a second fluid passage 80. External to the actuating mechanism proper is a hydraulic pump 82, a hydraulic accumulator 84 and a fluid accumulator 85. A hydraulic line 86 leads from the accumulator to a high pressure delivery chamber 88 which communicates with interconnecting passages 90 and 92 in the movable valve member 76. Additionally, there is provided a hydraulic fluid extraction line 94 leading from chambers 96 and 98 to the intake side of the pump 82. The movable valve member 76 is provided also with passages 100 and 102.

The operation of the structure of FIGURE 4 as thus far described is conventional and may be briefly stated as follows: Starting with the position of the movable valve member shown in FIGURE 4 the hydraulic fluid under high pressure from line 86 will not escape the passages 90 and 92. Nor will the pump receive any fluid through line 94 due to blockage of passages 100 and 102. However, should the movable valve structure 76 be moved a short distance to the left as viewed in FIGURE 4, passage 90 of the valve member will now communicate with passage 78 and passage 80 will communicate with passage 102. As a result, fluid under pressure will be delivered into the cylinder chamber to the left of the piston 62 and fluid will be simultaneously extracted from the chamber to the right of piston 62. This will cause the piston 62 to move to the right, operate the bell crank to move the push rod 40 upwardly to cause a change in the angle of attack of the hydrofoil 14 in a direction to cause loss of lift upon the hydrofoil. Whenever a desired change in angle of attack of the hydrofoil is achieved, and the valve member 76 returned to its position as shown in FIGURE 4, the piston 62 will be maintained in its new position. Movement of the valve member 76 to the right from its position shown in FIGURE 4, will cause reverse delivery and extraction of fluid and cause the piston 62 to move to the left, causing a change of angle of attack of the hydrofoil 14 which will cause increased lift. It will be understood that the same system can be used with the hydrofoil 16 and repetition of the illustration is thought unnecessary.

Figure 4A:
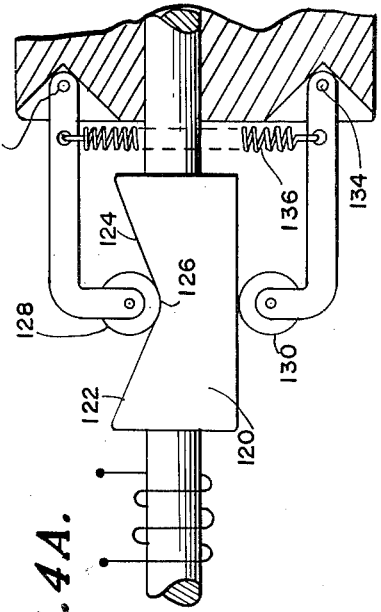
FIGURE 4A is a fragmentary view of a modification of FIGURE 4.

For purposes of integration into the remainder of the control system to be described hereinbelow, the movable valve member 76 of FIGURE 4 is provided at its right-hand end with a magnetizable armature 104 about which is wound a winding 106 having terminals 108 and 110. At the other end of the valve member 76 is a similar magnetizable armature 112 having a winding 114 with terminals 116 and 118. It may be explained at this point that if windings 106 and 116 carry equal currents and the windings are wound as shown in such direction that current flowing in the sense of positive to negative is entering terminals 108, and 116, the magnetic attraction on the armatures 104 and 112 will be equal and opposite and the valve structure 76 will not tend to move. However, unbalance of currents (increase in one and/or decrease in the other) will cause the valve member 76 to move in one direction or the other and powerful movement of the piston 62 can result. It will be desired that with equal and opposite currents the valve structure 76 should tend to center itself as shown in FIGURE 4. Accordingly, a cam member 120 having two inclined surfaces 122 and 124 meeting at a low point 126 may be acted upon by a roller 127 under spring biased pressure. As shown in FIGURE 4A, to prevent binding on member 76 there may be oppositely arrayed rollers 128 and 130 anchored to the framework of the structure at points 132 and 134 respectively, and drawn together by a tension spring 136 to provide a self-centering action in the absence of unequal currents.

A final structural explanation will be made of the altitude sensing devices 52 and 54 before proceeding with the explanation of the main portion of the circuit with the remainder of the control system.

Figure 5:
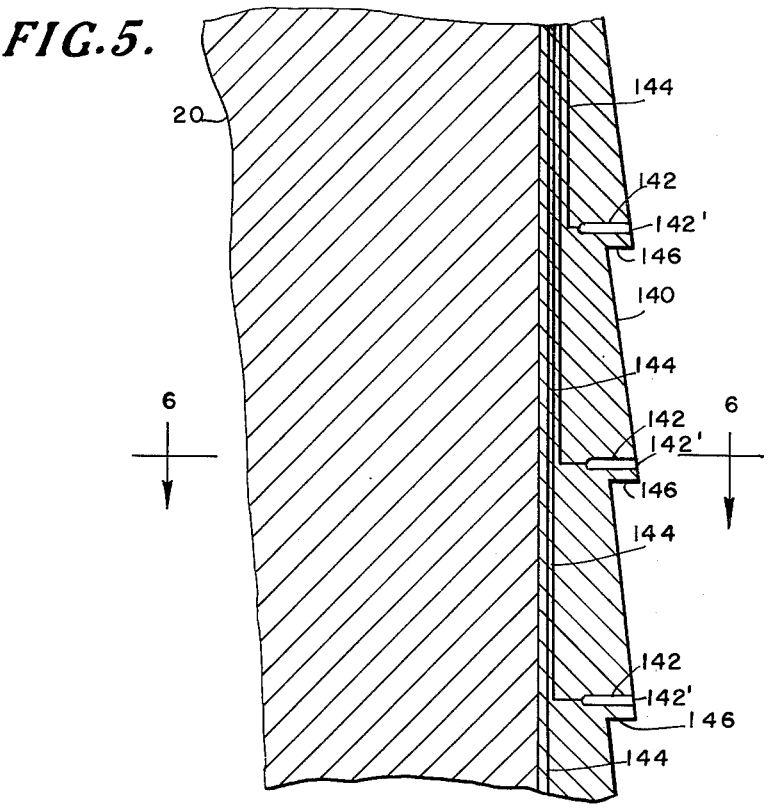
FIGURE 5 is a side elevational view in section of a portion of a hydrofoil supporting strut which also carries a submergence detecting construction in accordance with a feature of the present invention.

FIGURE 5 shows a side elevational view in section of a portion of the strut 20 (and the strut 22 and device 54 are the same) in the length thereof intermediate the hydrofoil 14 and the hull 10. On the leading edge of the strut is a faring or shell of an electrically non-conducting material, such as a so called plastic. Epoxy resin is an example. This faring is designated by reference character 140. Embedded within the faring 140 at certain points along the vertical dimension thereof are electrically conductive probe members 142 having an outer end thereof 142' exposed to the water in which the strut is partially or completely submerged. From each probe member 142 there extends an electrically conductive lead 144 which will eventually lead into the hull of craft 10, at all times insulated from the surrounding water. The probes 142 may be located say 3" apart vertically along the leading edge of the strut in the dimension of the strut expected to be moving into and out of the water as the craft is operated. As an example, there may be ten of the probes 142 on each of struts 20 and 22.

There will be a system electrically ground in good contact with the water so as to complete circuits to be explained hereinafter connected with probes 142. Where the struts 20 and 22 are metallic, these will provide excellent grounding contact with the water. However, other suitable grounding structure may be employed as will be well understood.

As will be explained in greater detail hereinafter, it has been found that the leading edge of the faring 140 should be stepped as at 146 at intervals so as to remove the tendency of the water surface upon interception by a fast moving strut to pile up along the strut and give erroneous altitude readings. Preferably the steps 146 should be placed, as shown in FIGURE 5, just below the placement of the respective conductive probes 142. It would be further understood that in FIGURE 5 the upper end of the view is intended to be the boat end of the strut and lower end of the hydrofoil end.

Figure 6:
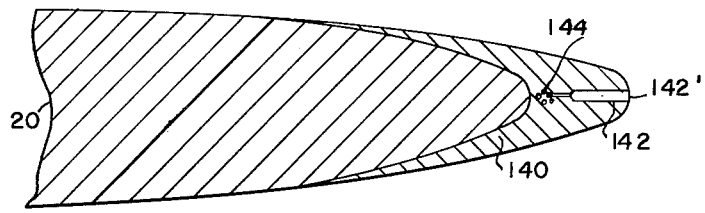
FIGURE 6 is a top sectional view along the line 6—6 of FIGURE 5.
Figure 7A:
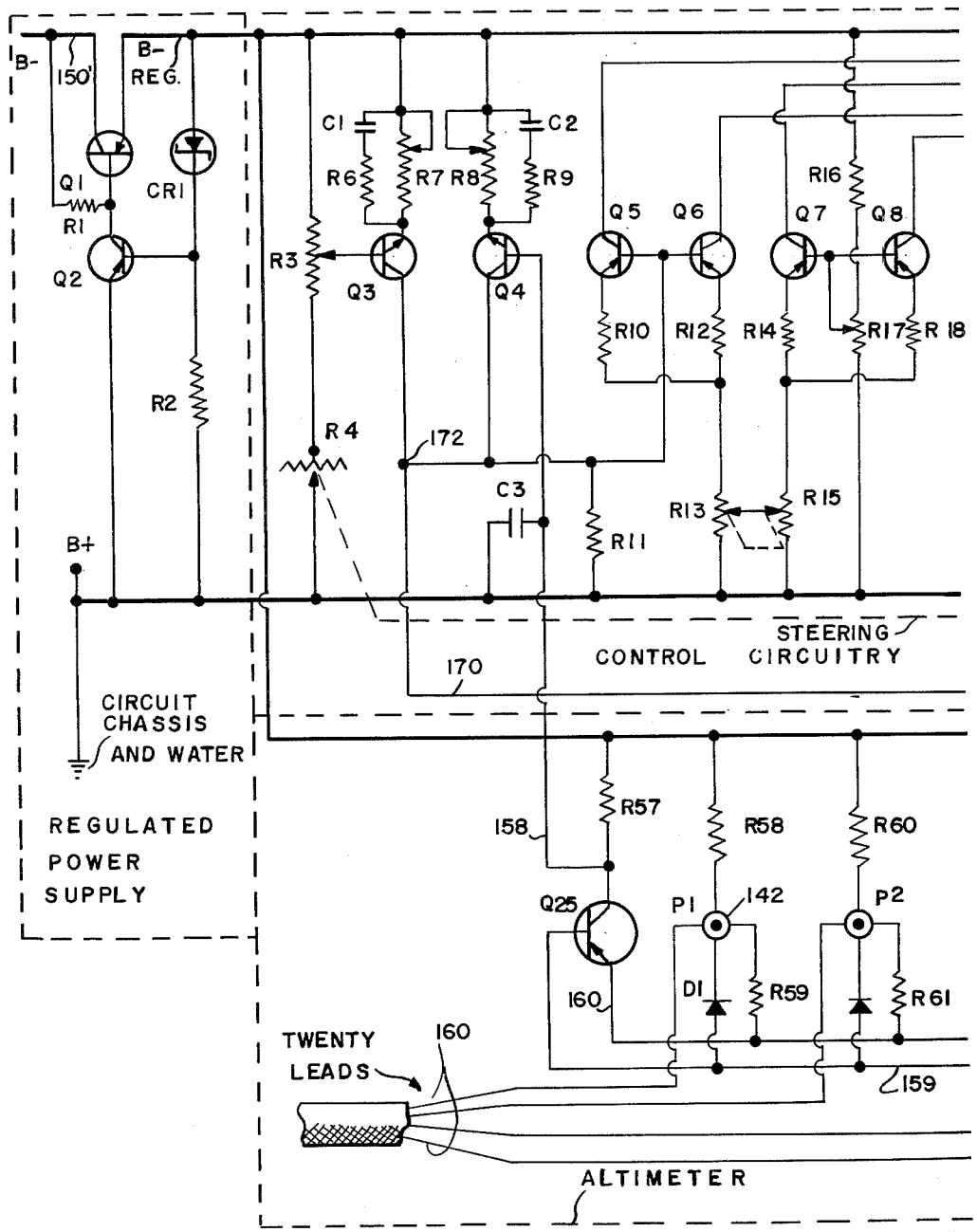
FIGURE 7A shows a portion of a schematic diagram of control circuitry which constitutes a part of the present invention.
Figure 7B:
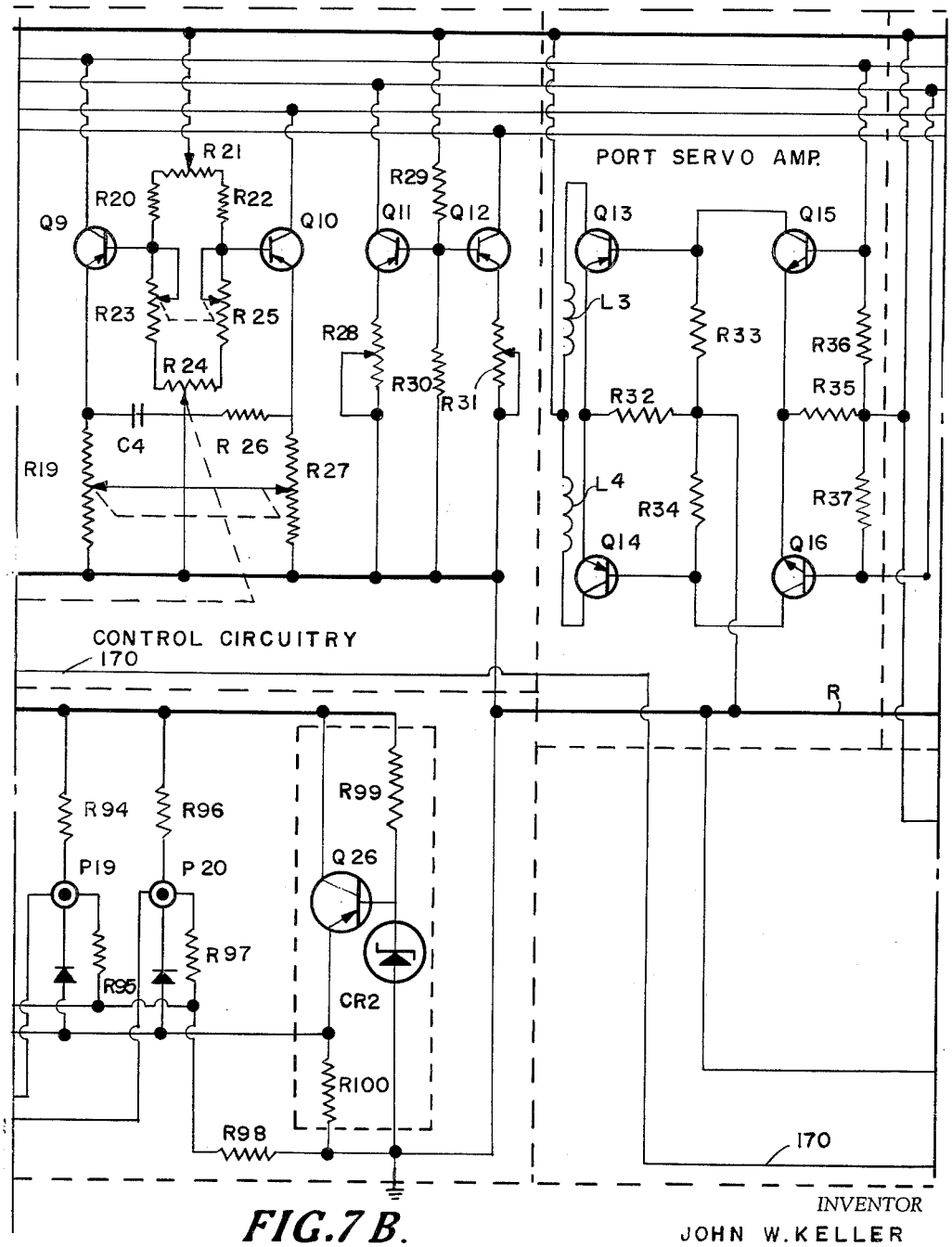
FIGURE 7B is to join with FIGURE 7A as indicated to show additional circuitry.
Figure 7C:
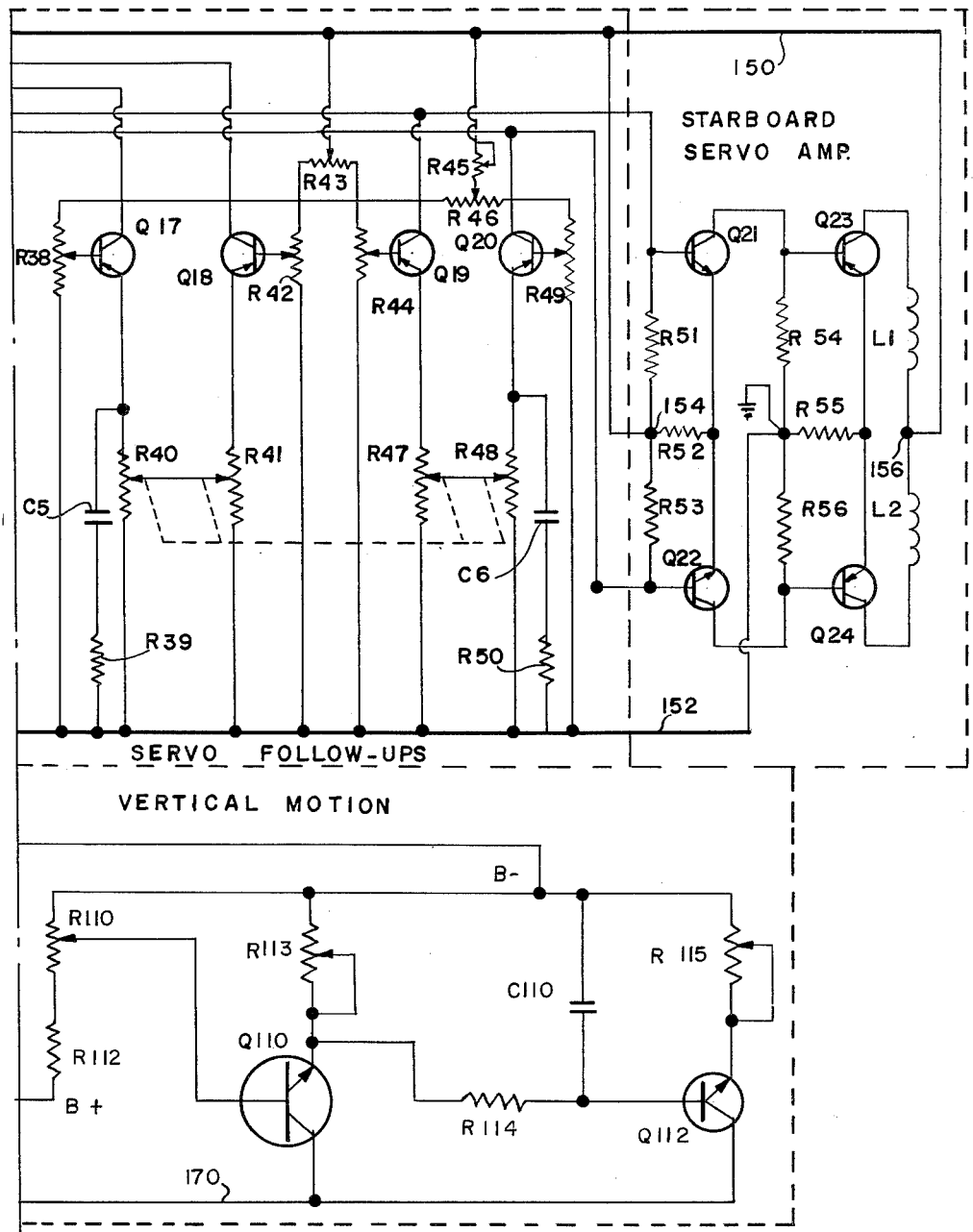
FIGURE 7C is to join with FIGURE 7B to show still more circuitry.

Reference is now made to FIGURES 7A, 7B and 7C. These figures are to be joined together from left to right and as such make up a complete circuit diagram, hereinafter referred to as FIGURE 7, the circuit of FIGURE 7 functions with the previously described components to provide a complete automatic control system, hereinafter referred to for convenience as the autopilot. This circuit performs the function of controlling the angle of attack or incidence of the two submerged hydrofoils 14 and 16. Three basic signals are employed by the autopilot. One is a signal based upon altitude of the craft above the surface of the water, and this altitude signal may result from detection in the structure of FIGURES 5 and 6 no further forward than the main struts 20 and 22 which support the forward hydrofoils. The second signal is one based upon the pitch angle (the angle a fore and aft line through the craft makes with the horizontal). The third signal is based upon roll or the angle which the beam or transverse dimension of the craft makes with the horizontal. The autopilot circuit operates upon these basic signals in several ways. One operation is to take a time derivative of the altitude signal. The autopilot may (and in the present illustrative examples does) also take a time derivative of the pitch signal. Additionally, in the example to be described there is a signal based upon vertical acceleration of the craft. The signals from altitude and pitch detection result in equal port and starboard foil actuation, and these foils are actuated in the same direction. The roll signal is used to cause differential port and starboard foil action to provide a roll reference. Additionally, the autopilot may, and in the present example does, obtain a time derivative of the roll signal to give roll damping.

Referring to FIGURE 7 see two section thereof, one bearing legend Port Servo Amplifier and the other Starboard Servo Amplifier. Referring first to the Starboard Servo Amplifier, windings L1 and L2 correspond to windings 106 and 114 in FIGURE 4. That is, these are the windings which carry currents which cause actuation of the hydraulic foil actuating device. A regulated B— voltage is supplied on line 150 with the B+ supplied on line 152, the latter being connected with ground for the circuit, which ground is also the ground to water via the water grounding member, which may be the struts 20 and 22. The circuit to be described is a transistorized circuit, and in this case the B supply from positive on line 152 at ground to minus on line 150 may be a drop of twenty-four volts, typical for transistor circuits. The input to the Starboard Servo Amplifier appears as two voltages, one across R51 and R53, the source of which will be described later. For the present purpose, it will be assumed that these voltages are equal and represent voltage rises toward posiive from the B— at junction 154 between R51 and R53. Transistors Q21 and Q22 have their emitters connected in common and if the voltage on the base of Q21 (voltage across R51) is equal to the voltage on the base of Q22 (voltage across R53) then the collector currents of Q21 and Q22 are equal and the voltage drops across R54 and R56 are equal. This situation leads similarly to equal collector currents in Q23 and Q24, which collector currents flow through the actuator windings L1 and L2 to the common junction 156 connected to B—.

If, for reasons to be developed later, the voltage across R51 becomes greater than the voltage across R53 the collector current of Q21 will become greater than that of Q22. Correspondingly, the voltage drop across R54 will become greater than that across R56. The net result is a greater current in L1 than in L2. As has been explained in connection with FIGURE 4, a greater current in one of the windings such as 106 compared to 114 of FIGURE 4 will cause a movement of the foil actuator. The relationship between FIGURE 7 and FIGURE 4 concerning the Starboard Servo Amplifier is that if the voltage across R51 becomes greater than that across R53 this means that greater current will flow in winding 106 of FIGURE 4 and lesser current in winding 114, whereby the piston 62 moves to the left in FIGURE 4 so as to increase the angle of incidence or attack of the foil 14 to the oncoming water. Conversely, in cases where the voltage across R53 becomes greater than that across R51, opposite movement of the foil results due to corresponding difference in currents between L1 and L2.

The circuitry of Q21, Q22 and Q23, Q24 make up what may be termed a two-stage differential amplifier. The resistors R52 and R55 in the respective stages provide a path for D.C. bias in each of the two stages. As will be explained more fully hereinafter the currents causing the voltage drops across R51 and R53 are the sum of the several various control currents. In the FIGURE 7 illustrative circuit all of the control currents come from the collectors of transistors employed for the various control functions. It should be understood that one looking into the collector of a transistor sees a very high dynamic impedance. Thus, when several collectors are connected together as they are for feeding the signals to the herein servo amplifiers the variation in any one of them has negligible effect upon all the others. Consequently, each individual control current being fed into the servo amplifiers is independent of all of the other control currents.

With reference to the port servo amplifier in FIGURE 7, it will be immediately apparent that windings L3 and L4 are those similar to L1 and L2 but on the port foil actuator, and the transistors Q15, Q16 correspond to transistors Q21 and Q22 of the Starboard Servo Amplifier, transistors Q13 and Q14 correspond to Q23 and Q24 and the resistors R35, R36, R37, R32, R33, R34 are the counterparts of the resistors similarly located in the Starboard Servo Amplifier.

Altitude signals ultimately appear upon line 158 shown extending between the section of FIGURE 7 bearing legend Altimeter and the section bearing legend Control Circuitry. The original derivation of altitude signals by use of the probes 142 has been explained in connection with FIGURES 5 and 6. In the case there mentioned, where there are ten of the special probes on each of struts 20 and 22, all twenty of the leads from these probes are shown entering hte altimeter circuitry as a bundle of twenty conductors, the reference character 160 designating this bundle of twenty leads.

The altimeter operates upon the principle of the exposed probes or contacts 142 changing the resistance to ground (the system ground, including the water) when the probes go from the medium of air into the medium of water as wave action or other fatcors cause the altitude of the craft to change. A voltage bias applied to each contact 142 is disturbed when the resistance between that contact and ground is changed due to submergence into the water. In accordance with the altimeter circuitry of FIGURE 7 the output voltage of the complete circuit on line 158 is proportional to the number of submerged contacts. Each probe or contact circuit works in the following way: taking the circuit of resistor R58 as an example, this is connected between a B— buss and one of the probes or contacts 142. It does not matter which one. When this particular contact or probe 142 is not submerged in the water, this probe (also designated P1 in FIG. 7) will be at −4 volts due to the presence of a diode D1 also connected to a −4 volt buss 159 maintained at this voltage due to the voltage drop across R100 in a typical voltage regulator circuit including resistance R99, transistor Q26 and Zener diode CR2. However, when P1 is submerged in water the resistance from P1 to ground is substantially reduced compared with the resistance of an air path or even a thin water film path. This resistance, being considerably smaller than the resistance R58, will result in the voltage on P1 dropping to very nearly ground potential. The proper choice of the size of resistance R58 and the size of voltage here specified as −4 volts can make the exposed contact altimeter insensitive to quite a heavy spray and yet properly indicate when a contact is fully submerged.

R59 is a relatively high resistance, providing a current through the emitter of Q25 over an emitter buss 160. The base of Q25 is held at the −4 volt potential on the buss 159, thereby giving a very low emitter input resistance. Since the resistance into the emitter of Q25 is very low the emitter voltage is constant regardless of current in the emitter.

It should now be noted that the remainder of the probes P3 through P20 are similarly arrayed with a resistor corresponding to resistor R58, an emitter resistor corresponding to R59 and a diode corresponding to D1. Note there are sixteen of the probes 142, P3 through P18, not shown, between FIGURES 7A and 7B. Thusly, the currents through R59 and the other emitter electrodes, those actually shown on FIGURE 7 being designated R61, R95 and R97, will all add, and the total current into the emitter of Q25 will result in a collector current through R57 proportional to the number of submerged contacts. For example, if contact probe P1 is out of the water, the voltage across resistor R59 is near zero since the emitter voltage of Q25 is near the −4 volt and so is the contact voltage. However, if contact probe P1 is in the water, the voltage on it is near zero and the voltage drop across R59 is 4 volts, resulting in a current through R59 which goes into the emitter of Q25. Similarly currents are generated from each submerged contact. The voltage drop across R57 resulting from the accumulated currents into Q25 give a collector voltage on Q25 that is different from the B— voltage by an amount proportional to the number of submerged contacts. Resistor R98 provides a small biasing current to Q25 to overcome the small amount of negative cutoff voltage existing there when no contact is submerged.

I have discovered that with the type of circuit just described excellent demarcation is achieved between the condition of a probe being definitely submerged and the conditions of thin water films and spray and splash which occur as a probe is withdrawn from submergence. The clamping action of diodes D1 permits selection of resistors R58, R60, etc. of suitable value to enable interconnection of the stages through resistors R59, R61, etc. on line 160 without impairing the aforesaid excellent demarcation between full submergence and withdrawal.

Condenser C3 connected to the line 158 and the B+ buss provides an integrating action, or low pass filtering, to filter out the spikes caused when a contact enters or leaves the water.

It should be understood that the remainder of the autopilot will function by reliance upon signals generated by other types of altimeters, and broadly no limitation to the altimeter circuit just described is required. However, the one shown represents an extremely reliable and inexpensive circuit and per se forms one of the present inventive features.

Referring now to the portion of FIGURE 7 bearing legend Control Circuitry (divided between FIGS. 7A and 7B), the altitude signal on line 158 is applied to the base of transistor Q4. A signal which is termed the pitch signal is applied to the base of transistor Q3. Resistor R3 is a potentiometer supplying a pitch signal from a vertical gyro (not shown). That is, a typical gyro will be provided and operated in the craft and deviation of the fore-and-aft axis of the craft from the horizontal will cause movement of the contact of R3 in one direction or the other along the resistance element. It may be stated that as viewed in FIG. 7, if the bow of the boat pitches up, the R3 wiper moves upwardly toward B—, causing the voltage on the base of Q3 to move toward B—. Resistor R7 provides a current in transistor Q3 which is directly proportional to the voltage between the base of Q3 and the B— voltage. The current path provided by R6 and C1 provides a current in Q3 which is proportional to the time derivative of the voltage between the base of Q3 and the B— voltage. R6 limits this time-derivative current or, stated in another way, provides a high frequency limit. Such a high frequency limit is useful to remove the effect of vibration. Accordingly, the current in the collector of Q3 is proportional to the fore and aft pitch of the craft, and also to the time rate of change of the pitch of the craft.

R4 is a center tap potentiometer connected to the steering wheel of the craft, so that movement of the steering wheel in either direction provides a bias signal independent of whichever direction the wheel is turned. This bias signal causes a current in Q3 similar to a positive pitch (bow up) of the craft. As will become more fully apparent hereinafter, such operation of R4 will cause both foils to react in a similar direction and in such manner that the boat is caused to pitch bow down proportional to the sharpness of the turn which improves the turning characteristics of the craft.

The voltage on the base of the altimeter transistor Q4 is a voltage proportional to the altitude of the craft. Resistors R8, R9 and condenser C2 in the circuit of this transistor function identically to resistors R7, R6 and condenser C1 and provide both a proportional and a time derivative altitude signal in the collectors circuit of Q4. R9 provides a high frequency limit, here useful to remove the effect of short choppy wave action on the water surface, very small with respect to the size of the boat, which presents no problem and does not require adjustment of the hydrofoils. The currents in the collectors of Q3 and Q4 pass through R11 to B+ (ground) and in so doing produce a bias voltage upon the basis of transistors Q5 and Q6 connected thereto. It may be mentioned at this time that transistors Q5, Q6, Q7 and Q8 are parts of what will be herein referred to as a port and starboard heave control circuit.

It may be desirable to add to the influence upon the bases of Q5 and Q6 the influence of a device which detects the vertical velocity and acceleration of a point on the boat subjected to a heaving motion. That is, where heave is encountered it may be desirable not only to insure that the foils are actuated in a direction to terminate the heaving motion, but the amount of the actuation should be dependent upon the velocity of heave and the rate of change of the velocity. A suitable circuit is shown in the section of FIGURE 7 (FIG. 7C) bearing legend Vertical Motion. Here R110 is a potentiometer whose wiper position is determined by a typical device responsive to the vertical acceleration of a point on the craft subject to heave action. R112 is employed to establish the steady state bias voltage of the accelerometer output, it being noted that R110 and R112 are in series between B+ and B—. Transistor Q110 is an emitter follower connected transistor, the collector current of which is directly proportional to acceleration and the gain of which is determined by the emitter resistance R113.

Resistance R114 and condenser C110 provide an integration of the accelerator voltage and therefore the voltage on the base of transistor Q112 is proportional to vertical velocity and the gain is determined by resistance R115. Both the acceleration and velocity are added and appear upon line 170 and are applied as a junction 172 to the line which already applies the altitude and pitch signals ot the bases of Q5 and Q6.

From FIGURE 7 it will be observed that transistors Q5 and Q6 are connected in a differential amplifier type connection with transistors Q7 and Q8. Note that the collector circuit of Q5 extends to the base of Q15 in the port servo amplifier and thus eventually influences the current through winding L3. The winding L4 of the port servo amplifier is controlled by transistor Q16, the base of which is connected with the collector of Q7. The collector of Q6 controls winding L1 in the starboard servo amplifier, winding L2 of which is connected with the collector of Q8. The collectors of Q5 and Q6 thus provide identical currents to the port and starboard servo amplifiers respectively. It will be noted that the bases of Q7 and Q8 are connected together and to the wiper of potentiometer R17 which is used by the operator only to adjust the basic desired reference altitude of the craft. Accordingly, the actual altitude due to wave action or heaving or rolling of the boat does not have a direct effect upon the collector currents of Q7 and Q8, influencing L4 and L2, respectively. However, the coupling between R13 and R15 brings about decreases in currents of Q7 and Q8 for increases in Q5 and Q6, and vice versa. The currents from Q7 and Q8 under steady state conditions may be said to be reference or standard potentials, against which the collector currents of Q5 and Q6 are referred. One advantage to having transistors Q7 and Q8 rather than some other source of standard signals, is that any fluctuations in the B supply, general comparable aging of the transistors and other components, etc., will be automatically compensated. The collectors of Q5 and Q6 provide currents to the port and starboard servo amplifiers in such relationship that increased foil angles of attack occur for relatively increasing currents in the collectors of Q5 and Q6 compared to Q7 and Q8, where decreases occur due to the R13—R15 coupling. Where the currents of Q5 and Q6 decrease instead of increase, the opposite occurs Q7 and Q8 are operative to produce opposite foil action.

Resistors R10, R12, R14 and R18 are provided to cover the situation where the manufacturing tolerances of the emitter resistances Q5, Q6, Q7 and Q8 may not be adequate to provide sufficiently uniform currents in the Q5—Q6 and Q7—Q8 pairs. If the just mentioned resistors have a one percent tolerance, connection into the emitter circuits will insure adequate uniformity in currents from these transistor pairs.

R13 and R15 are elements of a dual potentiometer which is employed to vary the gain of the heave circuit. Interconnection of the wipers of R13 and R15 which otherwise respectively supply the emitters of Q5, Q6 (R13) and Q7, Q8 (R15) provides a four transistor differential combination yielding a variable gain circuit for heave, the D.C. bias of which is not a function of the gain. This is a very desirable feature because it allows the operator to vary the heave gain of the autopilot without changing the trim of the craft. As previously indicated R17 is a potentiometer employed for adjusting the altitude at which the craft is to fly. R16 is placed in series with R17 to reduce the sensitivity of this altitude adjust control.

Still referring to the control circuitry of FIGURE 7 (FIG. 7B) transistors Q9 and Q10 are connected in a differential amplifier type connection so that the output of Q9 connects with the output of Q5 to the port servo amplifier. Similarly the output of Q10 combines with the output of Q6 to the starboard servo amplifier. R21 is a potentiometer the wiper of which moves in response to deviation of the operating member of a vertical gyro (not shown) which is arranged to indicate roll of the craft about its longitudinal axis. R20 and R22 are resistors to establish an intermediate bias on the basis of Q9 and Q10. R24 is a potentiometer, the wiper of which is mechanically coupled with the steering wheel (together with the wiper of R4). R23 and R25 are elements of a dual gang potentiometer employed for the purpose of adjusting the steering effect upon roll in a turn. Stated otherwise, for a position of the steering wheel giving a certain amount of turn, R23 and R25 can be adjusted to determine the amount of bank involved in this turn. R19 and R27 are elements of a further dual gang potentiometer, adjustment of which changes the gain of the entire differential amplifier, but without affecting its D.C. bias. This control can be conveniently termed a roll gain control. Condenser C4 provides roll damping, and resistor R26 limits the frequency response of roll damping.

Operation of the roll control circuit is as follows: Assume first the craft on a straight course with wheel centered. Now assume the craft lists to starboard. The wiper of potentiometer R21 goes to the left, causing the base voltage of Q9 to increase toward B— and the base voltage of Q10 to decrease toward ground potential. This results in relatively less current through L3 of the port servo amplifier which will decrease the angle of attack of the hydrofoil on the port side. At the same time more current through Q10 operates upon L1 of the starboard servo amplifier to increase the angle of attack of the starboard foil. Obviously, this has a righting effect to correct the starboard list. A similar but opposite action takes place upon operating a port list.

Now consider a starboard turn. Connection with the steering wheel causes the wiper on potentiometer R24 to move to the left, causing the voltage on the base of Q9 to decrease toward ground potential and Q10 to increase toward B—. Tracing the circuits through to the port and starboard servo amplifier shows that this movement of the wiper R24 causes a starboard bank. As the craft banks, the gyro potentiometer wiper of R21 moves to the left as in the case of the starboard list, with the result that the voltage on the bases of Q9 and Q10 is restored to normal at a banked altitude proportional to the amount the steering wheel has been turned. A similar but opposite action takes place for a port turn. Stated otherwise, the vertical roll gyro potentiometer R21 serves as in a follow-up capacity to terminate the bank producing action of the respective hydrofoils at a desired bank angle.

Depending upon the exact construction of the hydrofoil boat, it is conceivable that some designs of craft will perhaps bank of their own accord without hydrofoil action. This may be due to the rolling forces exerted by the marine propeller during a turn, or by virtue of the fact that the hydrofoil on the outside of the turn is traveling at a greater rate of speed than the hydrofoil on the inside of the turn, or for other reasons, or all combined. It could happen with a given craft that instead of having the turning of the steering wheel create a bank, an opposite tendency would be desired. If so, a simple interchanging of the leads of R24 would suffice. If no action is required, the gain of the overall roll control circuit could be reduced to nil. It will be thus apparent that considerable flexibility is accorded by the present invention.

Transistors Q11 and Q12 are provided to produce the necessary balancing currents to the sides of the port and starboard servo amplifiers opposite from the sides of these amplifiers served by the transistors Q9 and Q10. That is, there must be a balancing action against fixed current transistors Q11 and Q12 just as transistors Q7 and Q8 balance against Q5 and Q6. Resistances R29 and R30 are employed to give an intermediate voltage to the bases of Q11 and Q12. The currents in Q11 and Q12 are adjusted by resistances R28 and R31 respectively. These adjustments are useful not only to cancel out any unbalance due to the roll circuit, but also to provide balancing bias currents to the servo amplifiers to compensate any irregularities in the system.

Attention is next directed to the portion of FIGURE 7 (FIG. 7C) bearing legend Servo Follow-Ups. With reference to FIGURE 4, an unbalance in the currents controlling the hydraulic slide valve 76 will cause a given degree of movement of the valve structure. To take an example, suppose by reason of a cargo shift on the craft while it is steering a straight course a starboard list develops. The wiper of R21 would then move to the left, causing increase of current in L3 and decrease of current in L1. This would cause the pistons 62 of the respective hydraulic actuators (FIG. 4) to travel in opposite directions. The travel of the pistons would continue during the entire time there was such unbalance of currents as aforesaid in L3 and L1. The angles of attack of the respective hydrofoils would continue to change until the wiper of R21 came back to center. Then the piston travel would stop, and in a new position. Obviously, this would cause a severe overtravel of the craft into a port list condition. The port list would eventually correct itself back to neutral, but there would be again overtravel and the result would be constant hunting about the normal position. It is this sort of action which can be avoided by the follow-up circuitry. The effect of a starboard list has been taken simply as an example, and any other influences such as heave, pitch, vertical velocity tending to unbalance L1 and L3 have the same effect.

Transistors Q17—Q18 and Q19—Q20 are differential amplifier pairs. Resistors R38 and R49 are the actuator or foil follow-up potentiometers for the port and starboard foils, respectively. Referring to FIGURE 4, R38 or R49 corresponds to the potentiometer therein designated 70, having terminals 72 and 74 and wiper 68 which travels with the piston 62. Resistors R42 and R44 are port and starboard foil trim adjustments, respectively. Potentiometer R43 provides differential foil trim. Resistor R46 is a potentiometer restoring any differential gain that might exist between the port and starboard follow-up potentiometer. Potentiometer R45 is a foil trimming potentiometer, employed to make minor foil angle adjustments for changes in craft loading. Resistors R40, R41, R47 and R48 are elements of four-ganged potentiometers, employed to vary the follow-up circuit gain. Since the four-ganged potentiometer varies the amount of foil angle motion with a given stimulating signal in the control circuitry, it can reasonably be called the autopilot sensitivity control.

Condensers C5, C6 and resistors R39, R50 provide actuator damping.

The servo follow-up circuitry operates as follows: If a control signal from one or more of the several control sources upsets the port servo amplifier balance resulting in a port foil down motion, then the wiper or potentiometer R38 follows the foil movement and the wiper moves toward the B— voltage, increasing the current in Q17 and decreasing the current in Q18. The wiper on R38 will continue to move until the unbalance current from Q17 and Q18 restores the balance in the port servo amplifier. When balance in this amplifier is restored, the movable valve structure (FIG. 4) again centers itself and cuts off the flow of hydraulic fluid to act upon the piston 62. Accordingly, the port foil stops its motion in the newly established position. An opposite reaction takes place for an opposite unbalance in the input to the port servo amplifier.

The functioning of transistors Q19 and Q20 and their associated circuitry is entirely the same in regard to the starboard servo follow-up action upon the starboard servo amplifier.

It should now be apparent that in operation the servo follow-up circuits permit foil movement only for the time required for the pistons of the hydraulic system to move sufficient to occupy new positions whereat the foils are calculated to overcome the undesired situation needing correction, at a predetermined rate or degree of sensitiveness desired by the operator. The motion of the foils then stops while the correction is carried out. Turning to the example above of the effect of starboard list without the servo follow-up it was noted that foil movement would continue so long as the list condition was not corrected. However, with the follow-ups foil motion occurs only momentarily (can be quite short depending upon the power of the hydraulic actuators) and then the correction proceeds with the foils in given correcting positions. Overshoot or hunting of the craft about the desired position is, therefore, precluded. The overall gain of the follow-up system (R40, R41, R47, R48) changes the amount of foil angle motion into new foil positions for correcting or causing a deviation of the craft in relation to a given stimulating signal from the control circuitry. That is, in one condition of gain of the servo follow-up circuits a given control signal can cause a great or a small foil movement for correction purposes, the magnitude of the correction movement before the follow-up system reaches a null, depending upon the overall gain factor.

For supplying the FIGURE 7 circuit with well-regulated B—, transistors Q1 and Q2 and Zener diode CR1 (FIG. 7A) function with resistors R1 and R2 in a standard series type regulating circuit for providing on buss 150 well-regulated B—, say —24 volts, obtained from B— on a possibly unregulated buss 150'.

While those of ordinary skill in the electronics arts, upon understanding of the foregoing description will have no difficulty constructing and operating the circuit of FIGURE 7 as well as many equivalents thereof, the following component values are nevertheless given to further assist in reproduction of the control system herein described. It is to be understood, however, that while the following values are typical, presenting them here does not limit the scope of the present invention. The scope of the invention is to be determined from the appended claims.

In the following data resistances are in ohms except where K follows a number, in which case K represents 1,000. For example, 2K equals 2,000 ohms. The condenser numerical values are microfarads. Transistors and diodes are given their common "type" number designations as known in the United States at the present time.

*Resistances (R)*

| Component: | Value |
|---|---|
| 1 | 500 |
| 2 | 100 |
| 3, 21, 24 | 2K |
| 4 | 500 |
| 6, 35, 52 | 330 |
| 7, 8, 19, 27, 28, 31, 38, 42, 44, 49, 40, 41, 47, 48, 39, 50, 99 | 10K |
| 9 | 500 |
| 10, 12, 14, 18 | 680 |
| 11, 26, 33, 34, 36, 37, 51, 53, 54, 56, 43, 46, 45 | 1K |
| 13, 15, 17 | 2.5K |
| 20, 22 | 2.2K |
| 23, 25 | 5K |
| 29 | 6K |
| 30 | 3K |
| 32, 55 | 150 |
| 57 | 3.9K |
| 58, 60, 62, 64, 66, 68, 70, 72, 74, 76, 78, 80, 82, 84, 86, 88, 90, 92, 94, 96 | 6.8K |
| 59, 61, 63, 65, 67, 79, 71, 73, 75, 77, 79, 81, 83, 85, 87, 89, 91, 93, 95, 97 | 22K |
| 100 | 49 |
| 98 | 57K |
| 110 | 5K |
| 112 | 5K |
| 113 | 10K |
| 114 | 22K |
| 115 | 10K |

*Condensers (C)*

| Component: | Value |
|---|---|
| 1 | 1000 |
| 2 | 250 |
| 3, 4 | 40 |
| 5, 6 | .1 |
| 110 | 100 |

*Transistors (Q)*

| Component: | Type |
|---|---|
| 1, 26 | 2N155 |
| 2, 13, 14, 23, 24 | 2N192 |
| 3, 4, 15, 16, 21, 22, 110, 112 | 2N365 |
| 5, 6, 7, 8, 9, 10, 11, 12, 25, 17, 18, 19, 20 | 2N44 |

*Zener Diodes (CR)*

| | |
|---|---|
| 1 | 24 |
| 2 | 4 |

It is believed that the operation of the various aspects of the invention has been completely covered hereinabove in conjunction with the description of the structure and circuit components and connections. However, as a résumé of operation assume that the craft is first resting on its hull on the surface of the water. All of the altimeter contact probes (142, FIGS. 5, 6) will be submerged. This will cause such current through Q4 as to give relatively great angle of attack of the hydrofoils to the oncoming water as the craft moves forward (assume on a straight course). As soon as sufficient speed is attained, the hydrofoils will thus lift the craft out of the water. As the bow rises out of the water this automatically increases the angle of attack of the rear hydrofoil 18 (FIGS. 1–3) and the stern comes out of the water. As the stern rises the angle of attack of hydrofoil 18 automatically decreases and a self-adjusting position is achieved. If the water is assumed to be absolutely smooth, after a certain number of the contacts have moved above the water surface, the current through Q4 will reduce and stable flight at constant altitude will be achieved. Next assume that the surface of the water changes from a smooth condition to one with a short, choppy wave action. The altimeter signal on line 158 will then begin to fluctuate accordingly as probes go into and out of the water. However, since short chop (wavelength short with respect to boat length) on the surface itself is unimportant for proper boat operation, it is unnecessary to change the altitude of the boat from wave to wave. Of course, the wavelength and height of waves depends upon the size of boat and the altitude at which it is to be flown. The proper selection of the value of C3, the hydraulic actuator speeds, and the accelerometer gain will suppress the reaction of the boat to harmless short wavelengths and low height chop.

However, when the surface of the water is characterized by wave formation of fairly long wavelength compared to the length of the boat and/or the height of the waves is fairly large compared to the spacing of the hydrofoils from the hull, the altitude differential current in Q4 solves the problem of adjusting the hydrofoils to cope with the wave action. The altitude time derivative current through transistor Q4 is at a considerable phase angle to the altitude proportional current through Q4. Therefore, the control signal issuing to the port and starboard servo amplifiers can be thought of, and has the effect of, anticipating the waves which the craft is about to encounter. Of course, the fact of generation of a time derivative signal requires the proportional altitude signal to be changing. Thus, it is to be recognized that as the craft proceeds to be flown over a sea of significant wavelength and height, the craft will be more submerged at the instant of time the forward foils are passing through the crest of a wave, as compared to the time when the foils are passing through the trough of a wave. The power capabilities of the actuators, together with the gain or "tightness" or "sensitivity" of the autopilot system will determine the submergence differential experienced by the hydrofoil supporting struts as the craft progresses through a given sea.

It is to be emphasized that the autopilot can control either the entire hydrofoil or a flap or trim tab on the foil. In general, at least insofar as basic ideas are concerned, the action of a hydrofoil in water is quite similar to the action of an airfoil in the air and it is well known in connection with the latter that an entire airfoil may be moved to change the angle of attack and, therefore, the lift. Or flaps, trim tabs or minor portions of the complete foil can be operated. For purposes of convenience, reference herein to control of the lift effect of a foil embraces all such techniques.

As has been indicated hereinabove, a fixed angle of attack on the rear foil will normally suffice. However, it is clear that application of the principles of the present invention may be used to control the rear foil and no limitation to control only of the forward foils is necessary or intended.

It is to be also understood that while the circuit of FIGURE 7 is a D.C. transistorized circuit, upon understanding the principles of the present invention various other embodiments could be constructed, some of which would be A.C. circuits with suitable provision for obtaining a signal representing the time differential of the altitude and/or the pitch, etc.

It is also to be fully understood that the basic invention is usable with arrangements for detecting altitude, sensing pitch and roll, etc., quite different from the precise circuit shown in the illustrative example, and again, the hereinbelow appended claims are referred to for determination of the scope of the various inventive aspects of the present application. It is believed to be now apparent that by the present invention a considerable improvement is created over the prior art systems for control of submerged hydrofoil craft, wherein it has been necessary to provide spatial lead to the altitude signals for hydrofoil control. It has been required that altimeters be extended forward of the front hydrofoil strut positions in order to sense wave action before it reaches the hydrofoil position. This has given the prior craft extra time to prepare for an approaching wave, but at the expense of appendage of equipment that increased weight, added to cumbersomeness and often added to drag through the water. Therefore, a greater advantage has been gained by making the altimeter sensing strut integral with a strut already supporting the craft on one of its submerged foils.

Attention is drawn to the provision whereby altitude detection at spaced apart points is averaged, and roll correction comes from a vertical seeking device such as a gyro. This constitutes an inventive feature permitting good flight characteristics in cross-wise seas, without requiring a single center altitude detection requiring an otherwise unnecessary strut in the water.

The foregoing detailed description of illustrative embodiments of the inventive features have been given only for purposes of explanation of the principles involved, and the true scope of the invention is to be determined from the appended claims.

What is claimed is:

1. A system for measuring submergence into a conductive fluid comprising an elongated non-conductive body member for varying degrees of insertion into said fluid, a plurality of spaced apart conductive members on the body member and having at least a portion exposed for contact with said fluid, means for separately grounding the system to said fluid regardless of the degree of insertion of the body member into said fluid, a first source of potential, a plurality of circuit stages one for each conductive member, a point in each stage electrically connected to one of said conductive members, each stage having a first resistance means connected between one side of said first source and said point connected to one of said conductive members, the other side of said source connected to said grounding means, a second source of potential having a side connected in common with said one side of said first source, and the second side thereof being of value intermediate that of the first source, a plurality of unidirectional conducting means connecting the second side of the second source and each one of the conductive members to effect voltage clamping action on said conductive members, resistance means interconnecting all of the conductive members in common, to provide an output, each stage thereby comprising a voltage clamping device for insuring a predetermined maximum voltage excursion regardless of further increases in resistance of the fluid circuit, the arrangement being such that the amount of current flowing in said common output means is proportional to the number of conductive members the exposed surfaces of which are immersed in said fluid.

2. A detector for measuring submergence into a conductive fluid comprising an elongated body member of non-conducting material, and a plurality of spaced apart conductive members at least partially embedded therein along the length thereof for connection to an electrical submergence measuring circuit, the body member having forward extending and overhanging step protrusions positioned along its length, at least one for every said conductive member, to prevent rise of the surface of the fluid up the elongated member during forward motion thereof relative to the fluid.

References Cited in the file of this patent

UNITED STATES PATENTS

| | | |
|---|---|---|
| 1,133,023 | Hart et al. | Mar. 23, 1915 |
| 2,230,137 | Ewertz | Jan. 28, 1941 |
| 2,576,716 | Gardiner | Nov. 27, 1951 |
| 2,663,806 | Darlington | Dec. 22, 1953 |
| 2,696,796 | Amster | Dec. 14, 1954 |
| 2,709,979 | Rush et al. | June 7, 1955 |
| 2,775,892 | Godde | Jan. 1, 1957 |
| 2,838,690 | Eckert et al. | June 10, 1958 |